March 20, 1945.   G. P. SILBERSTEIN   2,371,779
RANGE FINDER
Filed April 23, 1943

GEORGE P. SILBERSTEIN
INVENTOR

BY Newton M. Perrins
J. Griffin Little
ATTORNEYS

Patented Mar. 20, 1945

2,371,779

UNITED STATES PATENT OFFICE 2,371,779

RANGE FINDER

George P. Silberstein, Rochester, N. Y., assignor to Eastman Kodak Company, Rochester, N. Y., a corporation of New Jersey Application April 23, 1943, Serial No. 484,255

15 Claims. (Cl. 88—2.7)

The present invention relates to range finders, and more particularly to those of the type known as "base-type" range finders in which the initial light-receiving and reflecting elements are spaced apart a fixed or base distance.

The principal object of the invention is the provision of a range finder provided with a pair of spaced light-receiving and reflecting elements at least one of which is mounted on a member which may be bent or flexed to vary the relative angular position of the elements for changes in the range or distance.

Still another object of the invention is the provision of such a bendable member which is flexed an amount which is always below the elastic limit of the member.

A further object of the invention is the provision of a light-transmitting bendable member on which the light-receiving and reflecting members are mounted for movement as a unit with the member.

And a still further object of the invention is the provision of a range finder of the class described, which is simple in construction, formed of few parts of rugged construction, easy and inexpensive to manufacture, and highly effective in use.

To these and other ends, the invention resides in certain improvements and combinations of parts all as will be hereinafter more fully described, the novel features of the invention being pointed out in the claims at the end of the specification.

In the drawing.

Similar reference numerals throughout the various views indicate the same parts.

Figure 1:
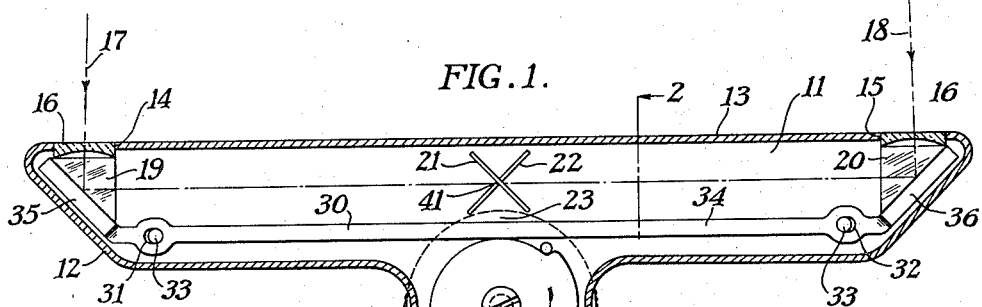
Fig. 1 is a plan view of a range finder constructed in accordance wtih the present invention, with the housing in section, to show more clearly the arrangement of the various parts.
Figure 2:
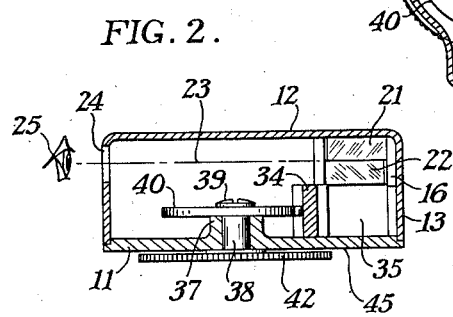
Fig. 2 is a vertical sectional view taken substantially on line 2—2 of Fig. 1.

The range finder illustrated in Figs. 1 and 2 comprise a base or support 11 on which is positioned and suitably secured a housing 12 of the shape best shown in Figs. 1 and 2. The front wall 13 of the housing is provided with a pair of spaced openings 14 and 15, each of which has mounted therein a lens 16. A pair of light beams 17 and 18 of an objective field pass through the lenses 16 of the windows 14 and 15 and are reflected by a pair of light-receiving and reflecting elements, such as prisms or mirrors 19 and 20, positioned behind and in optical alignment with the lenses 16, as is clearly apparent from inspection of Fig. 1, and as well known to those in the art. The elements 19 and 20 serve to bend the rays 17 and 18 at substantially right angles and to reflect these rays towards a pair of cross-reflecting members, such as mirrors 21 and 22, fixedly mounted on the base 11. The image of the two beams 17 and 18 may be viewed directly on the mirrors 21 and 22 or through a sight opening 24 formed in the housing, as clearly shown in Fig. 2. In the latter case, the rays are reflected along the line 23 to the sight opening 24.

It is apparent to those in the art that as the range varies, the angular position of one or both of the elements 19 and/or 20 must be changed to vary the relation of the reflections of the beams 17 and 18, such variations being in proportion to the distance to the object being measured, all of which is well known. It is preferred, however, to mount both elements 19 and 20 for simultaneous movement. To this end, the elements are suitably positioned and secured to the opposite ends of an elongated bendable member or bar 30 of the shape best shown in Fig. 1. This member is provided with a pair of openings or apertures 31 and 32 positioned adjacent the elements 19 and 20 and adapted to receive a pair of upstanding pins 33 on the base 11 to provide a pair of movable connections or pivots for the bar 30 on the base 11.

It will now be apparent that if the portion 34 of the bar 30 between the openings 31 and 32 is bent or flexed transversely, or upwardly as viewed in Fig. 1, the portions 35 and 36 carrying the elements 19 and 20 respectively will move about the pivots 33 to vary the relative positions of the elements 19 and 20. Such movement would change the relative positions of the rays reflected onto the mirrors 21 and 22. Obviously, the amount of such a change will depend on the degree or amount of the bending of the bar 30 and such bending may be utilized to indicate the range. To secure this result, the base 11 is provided with a tubular portion or sleeve 37 in which a stud 38 is rotatably mounted. The upper end of the stud has secured thereto, as by a screw 39, a cam 40 of the shape best shown in Fig. 1. This cam engages the portion 34 of the bar 30 substantially midway between pivots 33 and in substantial alignment with the intersection of the mirrors 21 and 22, as clearly shown in Fig. 1.

The arrangement is such that when the parts are positioned to indicate the minimum distance for which the range finder is designed, the cam 40 will just touch the bar 30 but the latter will not be bent or flexed. However, as the range increases, the cam 40 is rotated in the direction shown by the arrows in Fig. 1 to bend the bar 30. The required movement of the cam is accomplished by a hand wheel 42 carried by the lower end of the stud 38 and positioned below the base 11 where it can be readily accessible and viewable by the operator. The wheel 42 carries a scale 43 which cooperates with a fixed pointer 44 formed on the under side or face 45 of the base 11.

When the range is to be measured, the eye is positioned as shown at 25, Fig. 2, so that the relative positions of the two beams reflected by the mirrors or prisms 19 and 20 may be seen directly on the mirrors 21 and 22 or through the opening 24. The wheel 42 is then rotated until the two beams of the object being viewed are either brought into alignment or coincidence, depending on the arrangement employed. When the two beams have been properly adjusted, the range may be read directly from the scale 43.

Figure 3:
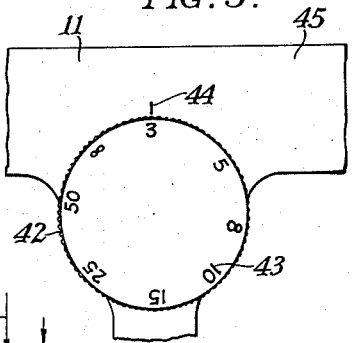
Fig. 3 is a partial view of the under side of the range finder illustrated in Figs. 1 and 2, showing the scale by which the range or distance may be determined.
Figure 4:
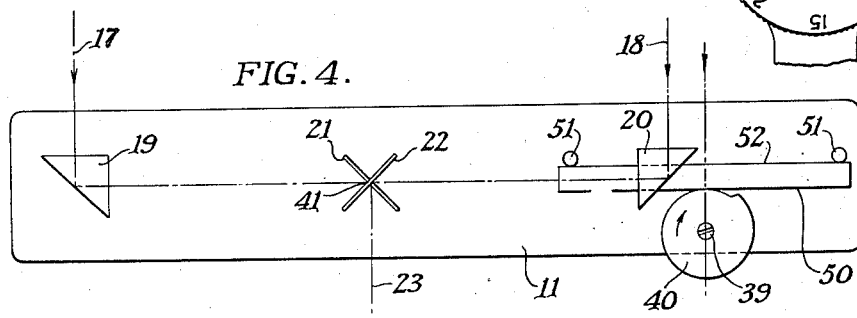
Fig. 4 is a view similar to Fig. 1, but with the housing removed, showing a modified arrangement of the range finder of the present invention in which only one of the light beams is controlled by a movable reflecting member mounted on or carried by the bendable member.

Fig. 4 shows a modified form of a range finder which differs from that shown in Figs. 1 to 3, and above described, in that only one of the initial light-receiving and reflecting members is movable, the other being fixed on the base 11. Parts corresponding to those illustrated in Figs. 1 and 3 are designated by the same numerals. In this modified arrangement, the prism 19 is fixedly mounted on the base 11, while the prism 20 is mounted on a short bendable member 50 carried by the base 11 and bendable about a pair of pivot points 51 carried by the base 11 and engaging the face 52 of the member 50 adjacent the ends thereof. The cam 40 engages the member 50 substantially midway between the pivots 51, and the rotation of the cam by the handwheel 42 in the direction indicated by the arrows, Fig. 4, serves to bend or flex the member 50, as described above in connection with Figs. 1 and 3. The prism 20 is carried by the bendable member 50 and is offset from the center thereof as clearly illustrated in Fig. 4. The greater the amount of offset or eccentricity of the prism relative to the cam 40, the greater the sensitivity of the instrument.

With this arrangement, the proper adjustment of the range finder is secured by the movement of the beam 18 only, rather than movement of both beams, as in the device illustrated in Fig. 1. The stationary beam reflected by the prism 19 and the movable beams reflected by the prism 20 are directed onto the cross-mirrors 21 and 22 where the relative position of the two beams may be viewed, in the manner described above.

Figure 5:
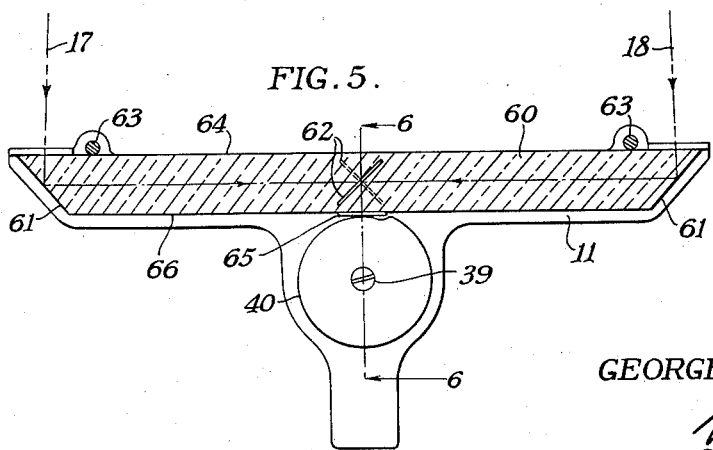
Fig. 5 is a plan view of still another modification of the range finder of the present invention showing the reflecting members carried by a light-transmitting member which is adapted to be flexed or bent to vary the positions of the reflecting members.
Figure 6:
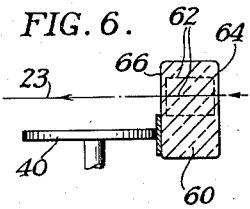
Fig. 6 is a transverse vertical sectional view taken substantially on line 6—6 of Fig. 5.

Figs. 5 and 6 show another modification in which the bendable member 60 is in the form of a light-transmitting member such, for example, as "Lucite." This bendable member is, in the present instance, of the shape best shown in Fig. 5, and formed with inclined end surfaces 61 which may be either suitably coated with a light-reflecting material or may have light reflecting members, such as mirrors, suitably secured thereto. The light beams 17 and 18 are reflected from the surfaces 61, or the mirror secured thereto, and are directed longitudinally through the material of the member 60 and towards a pair of cross-reflecting members or mirrors 62 embedded in the material of the member 60, as is apparent from inspection of Fig. 6. The relative position of the beams may be viewed directly on the mirrors 62 or through the opening 24.

When the cam 40 is rotated by the hand wheel 42, the member 60 will bend to shift to relative positions of the reflecting surface 61 to vary the positions of the reflected beams viewable on the mirrors 62. In order to secure the proper movement of the surfaces 61, the base 11 is provided with a pair of upstanding pins 63 which engage the front surface 64 of the member 60 to provide, in effect, spaced pivot points positioned adjacent the initial reflecting surfaces 61 and about which said surfaces move when the member 60 is bent or flexed by rotation of the cam 40. As in the above modification, the cam 40 engages the member 60 substantially midway between the pivot points 63. A suitable wearing plate 65 is preferably interposed between the cam 40 and the rear face 66 of the member 60. Also, the latter is not bent when the cam is adjusted to the minimum position for which the range finder is designed. However, as the cam is rotated from its minimum position, the member 60 is bent until the two beams viewable on the cross-mirrors 62 have been brought into proper relation. The range is then read from the scale 43, as is apparent from an inspection of Fig. 3.

In all the above arrangements, a bendable member or bar is utilized to secure the necessary relative movement of the two light beams at the point of viewing so that the beams may be properly adjusted to give the correct range. While the term bendable or flexible has been used in connection with the members 30, 50, and 60, it is to be understood that such bending or flexing is very small, being in the neighborhood of only a few thousandths of an inch, and in all cases well below the elastic limit of the material of the bendable member. The range finder of the present invention may be used separately or may be mounted on a camera or other device with which it is to cooperate.

The present invention, therefore, provides a range finder having at least one of the prisms or mirrors 19 and 20 mounted on a bar or member adapted to be bent or flexed to vary the relative position of the two reflected light beams. This arrangement provides a range finder which is simple in construction, relatively inexpensive, easy to manipulate, and highly effective in use.

While certain embodiments of the invention have been disclosed, it is to be understood that the inventive idea may be carried out in a number of ways. This application is, therefore, not to be limited to the precise details described, but is intended to cover all variations and modifications thereof falling within the scope of the appended claims.

2,371,779

I claim:

1. A range finder comprising, in combination, a base, a pair of spaced reflecting elements adapted to receive and reflect at least one of a pair of spaced image bearing light beams of an object field, a single bendable member supported by said base and carrying at least one of said elements, a pair of spaced pivots on said base engaging said member adjacent the ends thereof and means for bending said member about said pivots to vary the relative positions of said elements in proportion to variations in the distance to said object field to measure said distance.

2. A range finder comprising, in combination, a base, a pair of spaced reflecting elements adapted to receive and reflect at least one of a pair of spaced image bearing light beams of an object field, a member supported by said base and carrying at least one of said elements and bendable throughout its length, and means engaging said element and movable to bend the latter in a direction transversely of its length to vary the relative positions of said elements in proportion to variations in the distance to said object field to measure said distance.

3. A range finder comprising, in combination, a base, a pair of spaced reflecting elements adapted to receive and reflect at least one of a pair of spaced image bearing light beams of an object field, a bendable member carrying at least one of said elements, means for connecting said member to said base adjacent the element carried thereby, and means for bending said member throughout its length to move the element carried thereby about said connection to vary the relative positions of said elements in proportion to variations in the distance to said object field to measure said distance.

4. A range finder comprising, in combination, a base, a bendable member of light transmitting material supported on said base, a pair of spaced light reflecting elements on said member and positioned to receive and reflect at least one of a pair of spaced image bearing light beams of an object field, and means for bending said member to vary the relative positions of said elements in proportion to variations in the distance to said object field to measure said distance.

5. A range finder comprising, in combination, a base, a bendable member of light transmitting material supported on said base, a pair of light reflecting elements on said member adjacent the ends thereof and positioned to receive and reflect at least one of a pair of spaced image bearing light beams of an object field, means for connecting said member to said base adjacent at least one of said elements, and means for bending said member to vary the relative positions of said elements in proportion to variations in the distance to said object field to measure said distance.

6. A base type range finder comprising, in combination, a base, an elongated bendable member, a pair of base spaced light reflecting elements carried by the opposite ends of said member to receive and reflect at least one of a pair of base spaced image bearing light beams of an object field, means for pivotally connecting said member to said base adjacent at least one of said elements, and means for bending said member to move said one element about said pivot to vary the relative positions of said elements in proportion to variations in the distance to said object field to measure said distance.

7. A base type range finder comprising, in combination, a base, a bendable member carried by and movably connected adjacent the end thereof to said base, a pair of base spaced light reflecting elements mounted on said member adjacent the ends thereof for receiving and reflecting a pair of base spaced image bearing light beams of an object field, and a cam carried by said base and engaging said member intermediate said connections to bend the latter to simultaneously move said elements to vary the relative positions thereof in proportion to variations in the distance to said object field to measure said distance.

8. A base type range finder comprising, in combination, a base, a pair of base spaced reflecting elements adapted to receive and reflect at least one of a pair of base spaced image bearing light beams of an object field, a bendable member supported by said base and carrying at least one of said elements, means for movably connecting said members adjacent the ends thereof to said base, and means for bending said member intermediate said connections to move said one element to vary the relative positions of said elements in proportion to variations in the distance to said object field to measure said distance.

9. A base type range finder comprising, in combination, a base, a pair of base spaced reflecting elements adapted to receive and reflect at least one of a pair of base spaced image bearing light beams of an object field, a bendable member supported by said base and carrying at least one of said elements, means for pivotally connecting said element adjacent both ends thereof to said base, and means engageable with said member intermediate said pivots to bend said member substantially its full length to move said one element to vary the relative positions of said elements in proportion to variations in the distance to said object field to measure said distance.

10. A base type range finder comprising, in combination, a base, an elongated bendable member carried by said base, a pair of base spaced light reflecting elements carried by the opposite ends of said member for receiving and reflecting a pair of base spaced image bearing light beams of an object field, means for pivotally connecting said member to said base adjacent said elements, and means engageable with said member intermediate said pivots to bend said member to simultaneously move both of said elements about said pivots to vary the relative positions of said elements in proportion to variations in the distance to said object field to measure said distance.

11. A range finder comprising, in combination, a base, an elongated bendable member carried by said base, a pair of spaced light reflecting elements carried by the opposite ends of said member for receiving and reflecting a pair of spacd image bearing light beams of an object field, means for pivotally connecting said member to said base adjacent said elements, a third light reflecting element carried by said base and positioned intermediate said pair of elements to receive the light beams reflected therefrom and a cam carried by said base and engaging said member intermediate the pivots thereof to bend said member to move said pair of elements about said pivots to shift the relative positions of said reflected beams on said third element.

12. A range finder comprising, in combination, a base, an elongated bendable member carried by said base, a pair of spaced light reflecting elements carried by the opposite ends of said member for receiving and reflecting a pair of spaced image bearing light beams of an object field, means for pivotally connecting said member to said base adjacent said elements, a third light reflecting element fixedly mounted on said base and positioned intermediate said pair of elements to receive the light beams reflected therefrom, and a cam carried by said base and engaging said member intermediate the pivots thereof to bend said member to move said elements about said pivots to shift the relative positions of the pair of reflected beams on said third element.

13. A range finder comprising, in combination, a base, an elongated bendable light-transmitting member carried by said base, inclined reflecting surfaces formed on the opposite ends of said member for receiving and reflecting a pair of spaced image bearing light beams of an object field, means for pivotally connecting said member to said base adjacent said surfaces, and means for bending said member to vary the relative positions of said elements to adjust the relation of the reflected beams.

14. A range finder comprising, in combination, a base, an elongated bendable light-transmitting member carried by said base, inclined reflecting surfaces formed on the opposite ends of said member for receiving and reflecting a pair of spaced image bearing light beams of an object field, means for pivotally connecting said member to said base adjacent said surfaces, reflecting elements carried by said member and positioned in the path of the beams reflected by said surfaces to receive said beams, and means for bending said member to move said elements and said surfaces relative to said pivots to vary the relative positions of beams reflected by said surfaces.

15. A base type range finder comprising, in combination, a base, a reflecting element fixedly mounted on said base, a bendable member carried by said base and spaced from said element, a pair of pivots on said base engaging said member adjacent the ends thereof, a second reflecting element mounted on said member and arranged in optical alignment with said first element and spaced the base distance therefrom, said elements being adapted to receive and reflect a pair of base spaced image bearing light beams of an object field, a third reflecting element fixedly mounted on said base and positioned intermediate said first and second element to receive the beams reflected thereby, and means carried by said base to bend said member about said pivots to vary the relative positions of said first and second elements and the beams reflected onto said third element.

GEORGE P. SILBERSTEIN.